A. E. Lindsley,
Post Hole Digger.

No. 111,757.  Patented Feb. 14, 1871.

WITNESSES.
P. C. Dieterich
L. S. Mabee

INVENTOR
A. E. Lindsley
per
ATTORNEYS.

United States Patent Office.

AARON E. LINDSLEY, OF PAW PAW, MICHIGAN.

Letters Patent No. 111,757, dated February 14, 1871.

IMPROVEMENT IN POST-HOLE DIGGERS.

The Schedule referred to in these Letters Patent and making part of the same.

*To all whom it may concern:*

Be it known that I, AARON E. LINDSLEY, of Paw Paw, in the county of Van Buren and State of Michigan, have invented a new and improved Post-hole Digger; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
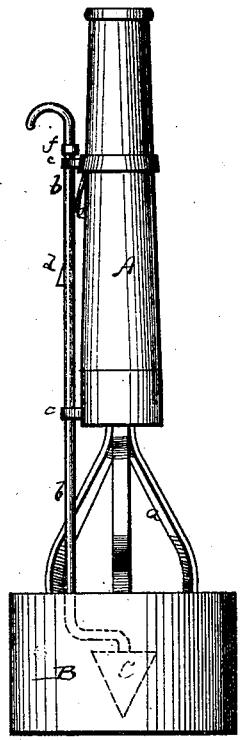
Figure 1 represents a side view of my improved post-hole digger.

This invention relates to a new instrument for digging the holes for fence-posts and other purposes, and consists in the application of a circular cutter and vertically adjustable clamping-block, by which the earth or sand is secured in the tubular case on which the cutter is formed.

A in the drawing represents the shank or handle of my improved post-hole digger. To the lower end of the same is secured, by means of projecting arms or brackets $a\ a$, a tube, B, of suitable diameter, and as long as the hole to be dug is to be deep.

The lower edge of the tube B is sharpened, to form a cutter, which facilitates the insertion of the instrument into the ground.

Instead of being of tubular form the case B can be made of prismatic or other suitable shape, according to the shape of hole to be made.

C is a block, of inverted, conical, or other suitable shape, secured to a vertical bar, $b$, which is guided in ears $c\ c$, that project from the shank A.

The bar $b$ has a notch or catch, $d$, which, by snapping over one of the ears, $c$, serves to sustain the block C in the elevated position.

A spring, $e$, crowds the bar $b$ away from the shank and serves to fit the catch $d$ over the ear.

A shoulder, $f$, on the bar defines the extent of its downward motion.

Figure 2:
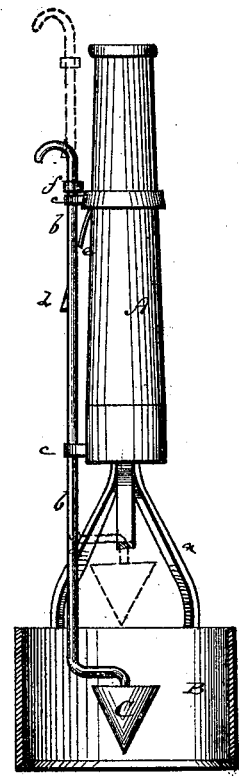
Figure 2 is a sectional side view of the same.

When the instrument is to be applied the block C is elevated, as by dotted lines in fig. 2.

The case B is forced into the ground to the desired depth; then the block is let down to lock the sand or earth which is within the case B.

A slight turn of the instrument will loosen the sand in the case from its hold, and will permit the elevation of the whole apparatus together with all the sand or earth contained in it.

The block C will secure the sand so firmly that it will remain in the tube while the same is being elevated, even if the sand should be quite loose.

Having thus described my invention,

I claim as new and desire to secure by Letters Patent—

The post-hole digger, herein described, consisting of a handle, A, cutting-tube B, and conical compresser C, vertically adjustable, by means of a rod, $b$, passing through guides, for the purpose of condensing and retaining the earth or sand within the tube B, substantially as specified.

AARON E. LINDSLEY.

Witnesses:
IRVING A. WHITMAN,
L. K. DIBBLE.